United States Patent [19]

Kim

[11] Patent Number: 5,622,351

[45] Date of Patent: Apr. 22, 1997

[54] WATER-SUPPLY VALVE OF A WASHING MACHINE

[75] Inventor: Jinsoo Kim, Incheon, Rep. of Korea

[73] Assignee: Daewoo Electronics Co., Ltd., Seoul, Rep. of Korea

[21] Appl. No.: 363,346

[22] Filed: Dec. 23, 1994

[30] Foreign Application Priority Data

May 31, 1994 [KR] Rep. of Korea ................. 94-12588
May 31, 1994 [KR] Rep. of Korea ................. 94-12597

[51] Int. Cl.$^6$ ................................................. F16K 31/08
[52] U.S. Cl. ...................... 251/30.03; 251/45; 251/65; 251/129.04; 251/129.09; 251/129.1; 335/302
[58] Field of Search ........................ 251/30.02, 30.03, 251/30.04, 30.05, 45, 46, 65, 129.04, 129.15, 129.19, 129.2, 129.09, 129.1; 335/302

[56] References Cited

U.S. PATENT DOCUMENTS

| | | | |
|---|---|---|---|
| 2,579,723 | 12/1951 | Best | 251/129.1 |
| 4,361,309 | 11/1982 | Sogabe | 251/129.09 |
| 4,502,661 | 3/1985 | Swanson | 251/30.04 |
| 4,682,574 | 7/1987 | Kreuter | 251/129.1 |
| 4,719,882 | 1/1988 | Kreuter | 251/129.1 |
| 4,749,167 | 6/1988 | Gottschall | 251/129.1 |
| 4,826,129 | 5/1989 | Fong et al. | 251/129.04 |
| 4,829,947 | 5/1989 | Lequesne | 251/129.1 |
| 4,831,973 | 5/1989 | Richeson, Jr. | 251/129.1 |
| 4,948,090 | 8/1990 | Chen | 251/30.03 |
| 4,971,106 | 11/1990 | Tsutsui et al. | 251/30.03 |
| 4,972,996 | 11/1990 | Cerny | 251/129.1 |
| 4,995,586 | 2/1991 | Gensberger et al. | 251/30.04 |
| 5,080,324 | 1/1992 | Chi | 251/30.03 |
| 5,124,598 | 6/1992 | Kawamura | 251/129.1 |
| 5,406,241 | 4/1995 | Kawamura | 251/129.09 |

FOREIGN PATENT DOCUMENTS

| | | |
|---|---|---|
| 0219572 | 4/1987 | European Pat. Off. . |
| 2261278 | 6/1974 | Germany . |
| 1427360 | 3/1976 | United Kingdom . |

OTHER PUBLICATIONS

Patent Abstracts of Japan, vol. 9, No. 272 (M–425) (1985), Oct. 30, 1985, JP-A-60-116980, Jun. 24, 1985.
Patent Abstracts of Japan, vol. 8, No. 230 (M–333) (1667), Oct. 23, 1984, JP-A-59-110,983, Jun. 27, 1984.

*Primary Examiner*—George L. Walton
*Attorney, Agent, or Firm*—Oliff & Berridge

[57] ABSTRACT

Disclosed is a water-supply valve of a washing machine in which the consumption of electric power can be minimized in opening and closing the valve to supply water into and block off the water supply into a washing tub of the washing machine. In the water-supply valve, an actuator rod is elevated against downward biasing force of a spring by a magnetic force of the first solenoid generated by applying an electric current thereto, and then is retained at its uppermost position by the attractive force of the permanent magnet. And, the actuator rod starts to be lowered by a magnetic force of the second solenoid generated by applying an electric current thereto, and is retained at its lowermost position by the downward biasing force of the spring.

10 Claims, 3 Drawing Sheets

WATER-SUPPLY VALVE OF A WASHING MACHINE

BACKGROUND OF THE INVENTION

1. Field of the Invention

The present invention relates to a water-supply valve of a washing machine, and more particularly to a water-supply valve of a washing machine in which the consumption of electric power can be minimized in opening and closing the valve to supply water into and block off the water supply into a washing tub of the washing machine.

2. Description of the Prior Art

FIG. 3 is a side sectional view of a conventional general water-supply valve of a washing machine, which is open or closed by operation of solenoids to cause water to be supplied into or blocked off into a washing tub of the washing machine.

Referring to FIG. 3, a water-introducing tube 11 for introducing water is connected to a valve body 10 of the water-supply valve, and a water-supply tube 12 for supplying water into the washing tub is vertically connected to valve body 10 near water-introducing tube 11. A reservoir 13 for interconnecting water-introducing tube 11 and a water-supply tube 12 is defined directly above water-supply tube 12.

A diaphragm 20 is disposed on the bottom surface of reservoir 13 and is in close contact with water-introducing tube 11 and a water-supply tube 12 to separate reservoir 13 therefrom. Diaphragm 20 has a water-inflow port 21 formed at an outer portion thereof to interconnect water-introducing tube 11 and reservoir 13 in order for water to flow into reservoir 13, and a water-exhaust port 22 at the center thereof to interconnect reservoir 13 and water-supply tube 12 in order for water retained in reservoir 13 to be supplied into the washing tub.

An actuator chamber 31 connected to reservoir 13 is defined above reservoir 13 by a cylindrical wall 10a of valve body 10. A solenoid 40 for generating magnetic force when electric power is supplied is disposed in cylindrical wall 10a.

An actuator rod 60 for opening and closing water-exhaust port 22 is disposed in actuator chamber 31. Actuator rod 60 is elastically supported on an upper wall-surface of actuator chamber 31 by a spring 50.

In the above-described conventional water-supply valve, when water is not supplied into the washing tub, water-exhaust port 22 is closed so that water is not supplied into water-supply tube 12 but retained in reservoir 13, and accordingly the pressure in reservoir 13 is maintained to be the same as that in water-introducing tube 11.

In order to supply water into the washing tub, an electric current is applied to solenoid 40 so as to generate a magnetic force by solenoid 40. Then, actuator rod 60 is moved upward in actuator chamber 31 while compressing spring 50, and accordingly the water retained in reservoir 13 is supplied into the washing tub through water-exhaust port 22. Therefore, the pressure in reservoir 13 becomes lower than that in water-introducing tube 11, so diaphragm 13 is elevated by the pressure difference between the inside of reservoir 13 and the inside of water-introducing tube 11. Then, water-introducing tube 11 is directly interconnected to water-supply tube 12, so that water flows directly from water-introducing tube 11 into water-supply tube 12 without passing through water-inflow port 21 and water-exhaust port 22.

When the electric current applied to solenoid 40 is interrupted, actuator rod 60 is restored to its initial position by spring 50, and water-exhaust port 22 is closed again.

In the above-described conventional water-supply valve, electric power supply to solenoid 40 must be continued while water is supplied into the washing tub, and therefore, the electric power consumption is too large. Further, fine wires of solenoid 40 can be broken or solenoid 40 can be caught on fire due to heat generated by the continuous application of electric current to solenoid 40 during water supply.

SUMMARY OF THE INVENTION

The present invention is intended to overcome the above-discussed and numerous other disadvantages and deficiencies of the prior art.

Therefore, it is an object of the present invention to provide a water-supply valve of a washing machine, in which electric power needs not be continuously supplied to the water-supply valve while water is supplied into a washing tub of the washing machine, so that the electric power consumption by the valve can be greatly reduced, and a breaking of fine wires of solenoids and a fire of the solenoids due to heat generated by the continuous supply of electric power to the solenoids can be prevented.

To achieve the above object, the present invention provides a water-supply valve of a washing machine comprising:

a valve body including a first chamber defined in a middle part thereof, a second chamber defined over the first chamber, a reservoir defined beneath the first chamber and connected to the first chamber, and a first and a second solenoids;

a water-introducing tube connected to the reservoir to introduce water thereinto;

a water-supply tube having a first end connected to the reservoir, and a second end connected to a washing tub of the washing machine;

an actuator rod movable up and down in the first chamber, the actuator rod being forced downward by elastic biasing force of a first spring disposed on an upper wall-surface of the first chamber;

a diaphragm disposed movably up and down in the reservoir according to the upward and downward movements of the actuator, the diaphragm having a water-inflow port for interconnecting the water-introducing tube and the reservoir, and a water-exhaust port for interconnecting the water-supply tube and the reservoir, and when the actuator rod is at its lowermost position, the diaphragm being in close contact with a lower bottom surface of the reservoir by the actuator rod, and the exhaust-port of the diaphragm being blocked off by the actuator rod; and a permanent magnet for applying an upward attractive force to the actuator rod, the actuator rod being retained at its uppermost position by the upward attractive force when the actuator rod has been elevated against the downward biasing force of the first spring by a magnetic force of the first solenoid generated by applying an electric current to the first solenoid, and the actuator rod being returned to its lowermost position by applying an electric current to the second solenoid.

According to a first embodiment of the present invention, the first and second solenoids are disposed in a cylindrical wall defining the first chamber, and respectively enclosing an upper and a lower parts of the first chamber, and the permanent magnet is disposed in the second chamber.

According to a second embodiment of the present invention, the first and second solenoids are disposed in a cylindrical wall enclosing the first and second chambers. The water-supply valve according to the second embodiments further includes a holding rod movable up and down in the second chamber, the holding rod being forced downward by a second spring disposed on an upper wall-surface of the second chamber. The permanent magnet is disposed on the actuator rod while being incorporated therewith, so that the attractive force is applied between the actuator rod and the holding rod.

In the water-supply valve of a washing machine according to the first embodiment of the present invention as described above, the actuator rod is elevated against the downward biasing force of the first spring by a magnetic force of the first solenoid generated by applying an electric current to the first solenoid, and then the actuator rod is retained at its uppermost position by the attractive force between the permanent magnet and the actuator rod. Also, the actuator rod is lowered against the attractive force by a magnetic force of the second solenoid generated by applying an electric current to the second solenoid, and then retained at its lowermost position by the downward biasing force of the first spring.

Particularly in the water-supply valve of a washing machine according to the second embodiment of the present invention, the actuator rod is lowered according to the upward movement of the holding rod against the downward biasing force of the second spring and the attractive force between the actuator rod and the holding rod by the magnetic force generated by applying an electric current to the second solenoid.

BRIEF DESCRIPTION OF THE DRAWINGS

The above objects and other advantages of the present invention will become more apparent by describing in detail preferred embodiments thereof with reference to the attached drawings, in which.

DETAILED DESCRIPTION OF THE PREFERRED EMBODIMENTS

Hereinafter, several preferred embodiments of the present invention will be described in detail with reference to the accompanying drawings.

Embodiment 1

Figure 1:
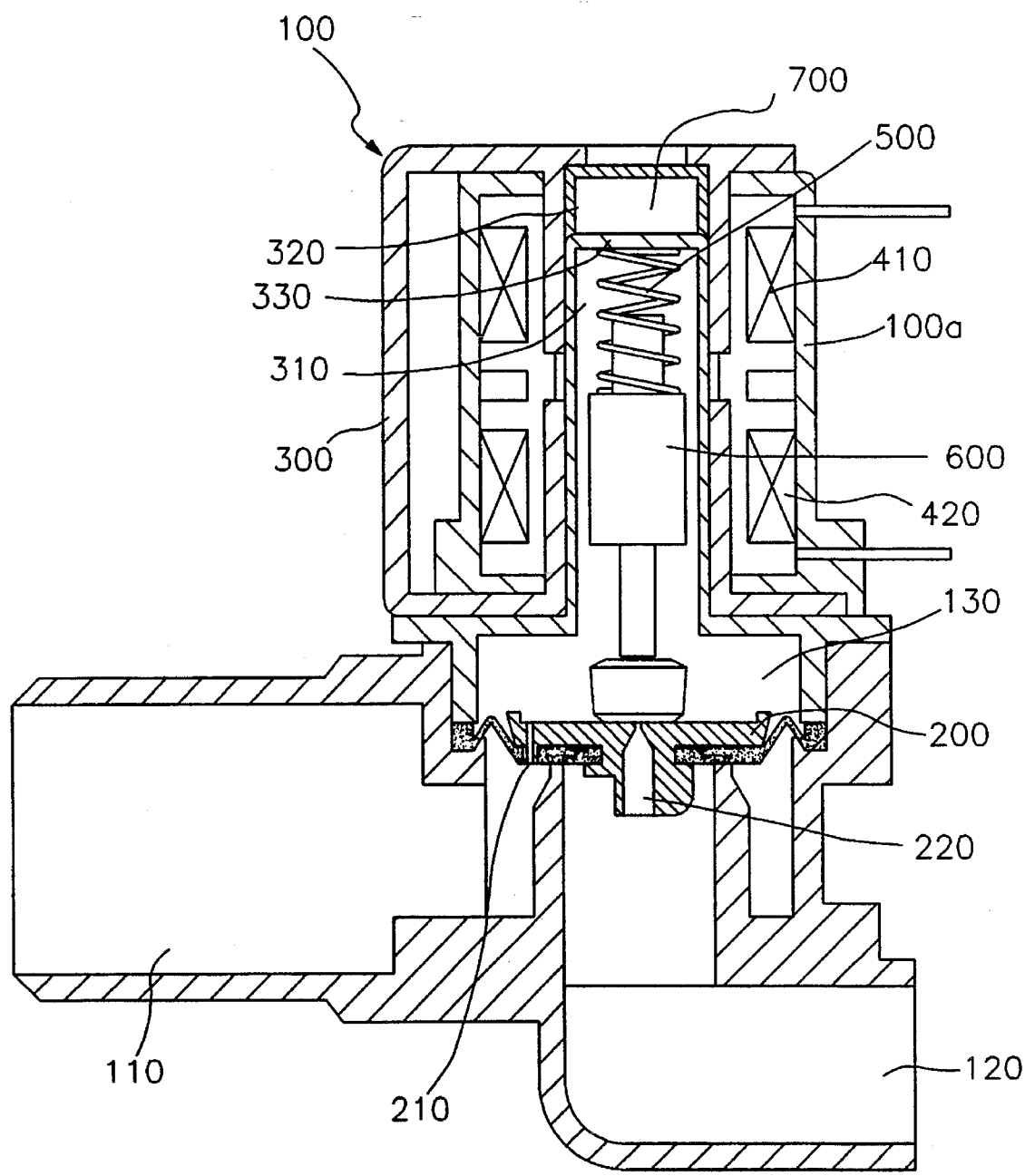
FIG. 1 is a side sectional view of a water-supply valve of a washing machine according to a first embodiment of the present invention.

FIG. 1 is a side sectional view of a water-supply valve of a washing machine according to a first embodiment of the present invention.

Referring to FIG. 1, a water-introducing tube 110 for introducing water is connected to a valve body 100 of the water-supply valve, and a water-supply tube 120 for supplying water into the washing tub is vertically connected to valve body 100 near water-introducing tube 110. A reservoir 130 for interconnecting water-introducing tube 110 and water-supply tube 120 is defined directly above water-supply tube 120.

A diaphragm 200 is disposed on the bottom surface of reservoir 130, and is in close contact with water-introducing tube 110 and water-supply tube 120 to separate reservoir 130 therefrom. Diaphragm 200 has a water-inflow port 210 formed at an outer portion thereof to interconnect water-introducing tube 110 and reservoir 130 in order for water to flow into reservoir 130, and a water-exhaust port 220 at the center thereof to interconnect reservoir 130 and water-supply tube 120 in order for water retained in reservoir 130 to be supplied into the washing tub.

A first chamber 310 connected to reservoir 130 is defined above reservoir 130 by a cylindrical wall 100a of valve body 100, and a second chamber 320 separated from first chamber 310 by a partition wall 330 is defined above first chamber 310.

A first solenoid 410 and a second solenoid 420 respectively for generating magnetic force when electric power is supplied thereto are disposed in cylindrical wall 100a.

An actuator rod 600 for opening and closing water-exhaust port 220 according to the operation of first and second solenoids 410 and 420 is disposed in actuator chamber 310. Actuator rod 600 is elastically supported on a surface of partition wall 330 by a first spring 500, and closes water-exhaust port 220 at its lowermost position. A permanent magnet 700 is disposed in second chamber 320.

Meanwhile, a reference numeral 300 not described above designates a case surrounding cylindrical wall 100a to protect valve body 100.

Hereinafter, the operation of the water-supply valve having the above construction according to the present embodiment of the present invention will be described.

When actuator rod 600 is pushed downward by first spring 500 to block off water-exhaust port 220, water introduced into reservoir 130 through water-introducing tube 110 and water-inflow port 210 is not supplied into water-supply tube 120 through water-exhaust port 220 but retained in reservoir 130. In this case, the pressure in reservoir 130 is maintained to be the same as that in water-introducing tube 110.

When an electric current is applied to first solenoid 410 automatically by a microcomputer or manually by handling a switch, magnetic force is generated by first solenoid 410, and actuator rod 600 retained at its lowermost position by first spring 500 moves upward by virtue of the magnetic force while pressing first spring 500, and accordingly water-exhaust port 220 is open.

Meanwhile, the attractive force between actuator rod 600 and permanent magnet 700 in second chamber 320 is in inverse proportion to square of the distance therebetween, while the downward biasing force of first spring 500 is in proportion to the distance that first spring 500 is compressed. Therefore, after actuator rod 600 passes a position at which the attractive force and the biasing force are equal to each other in the course of moving upward, actuator rod 600 continues to move upward and then is maintained at its uppermost position while pressing first spring 500 by virtue of the attractive force of permanent magnet 700 without the magnetic force by first solenoid 410.

That is, electric power supply to first solenoid 410 is ceased after actuator rod 600 passes the position at which the attractive force and the biasing force are equal to each other in the course of moving upward, and then actuator rod 600 continues to move upward only by the attractive force between actuator rod 600 and permanent magnet 700.

In this case, the electric power supply to first solenoid 410 can be continued until actuator rod 600 reaches the uppermost position thereof in order to assure reliable continuous upward movement of actuator rod 600.

When actuator rod 600 is retained at its uppermost position by permanent magnet 700, water-exhaust port 220 is open, and accordingly water retained in reservoir 130 flows through water-exhaust port 220 into water-supply tube 120. In this case, the pressure in reservoir 130 decreases below that in water-introducing tube 110, so that water introduced into water-introducing tube 110 pushes up diaphragm 200, and thereby water-introducing tube 110 and water-supply tube 120 are connected with each other and water is directly supplied from water-introducing tube 110 to water-supply tube 120 without passing through water-inflow port 210 and water-exhaust port 220.

When water supply into the washing tub is completed, electric power is supplied to second solenoid 420, which is then magnetized, and actuator rod 600 is lowered by the magnetic force of second solenoid 420 and elastic force of first spring 500 against the attractive force between permanent magnet 700 and actuator rod 600.

In this case, after actuator rod 600 passes the position at which the biasing force of first spring 500 and the attractive force between permanent magnet 700 and actuator rod 600 are equal to each other in the course of being lowered, electric power supply to and accordingly provision of magnetic force by second solenoid 420 are ceased.

Then, actuator rod 600 continues to be lowered only by the downward biasing force of first spring 500 larger than the decreasing attractive force between permanent magnet 700 and actuator rod 600, and pushes diaphragm 200 downward while blocking off water-exhaust port 220.

When the lower surface of diaphragm 200 becomes in close contact with the bottom of reservoir 130 and water-exhaust port 220 is completely blocked off by actuator rod 600 as shown in FIG. 1, water supply into the washing tub is interrupted.

Also in this case, the electric power supply to second solenoid 420 can be continued until actuator rod 600 reaches its lowermost position in order to assure reliable continuous downward movement of actuator rod 600.

Embodiment 2

Figure 2:
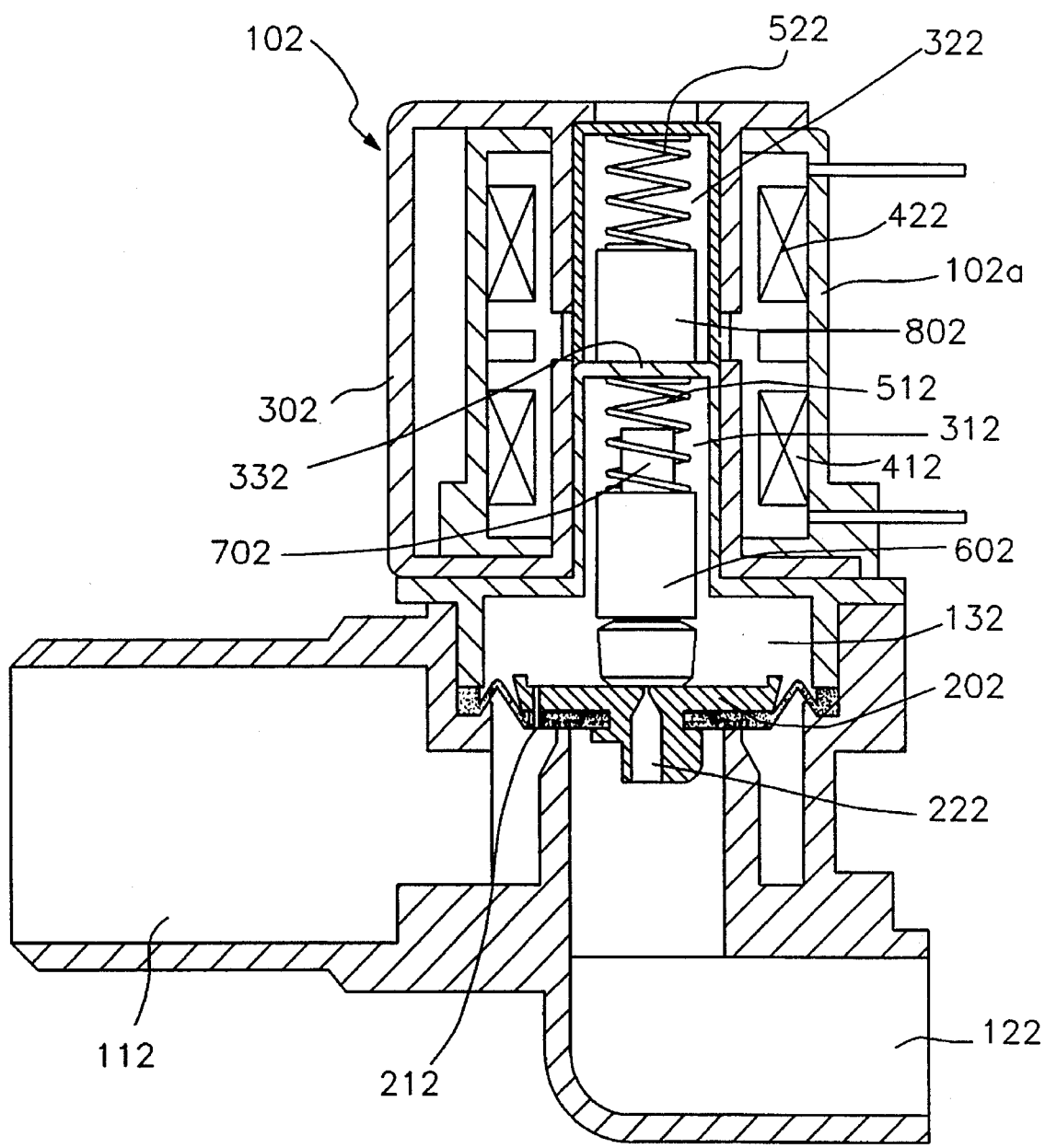
FIG. 2 is a side sectional view of a water-supply valve of a washing machine according to a second embodiment of the present invention.
Figure 3:
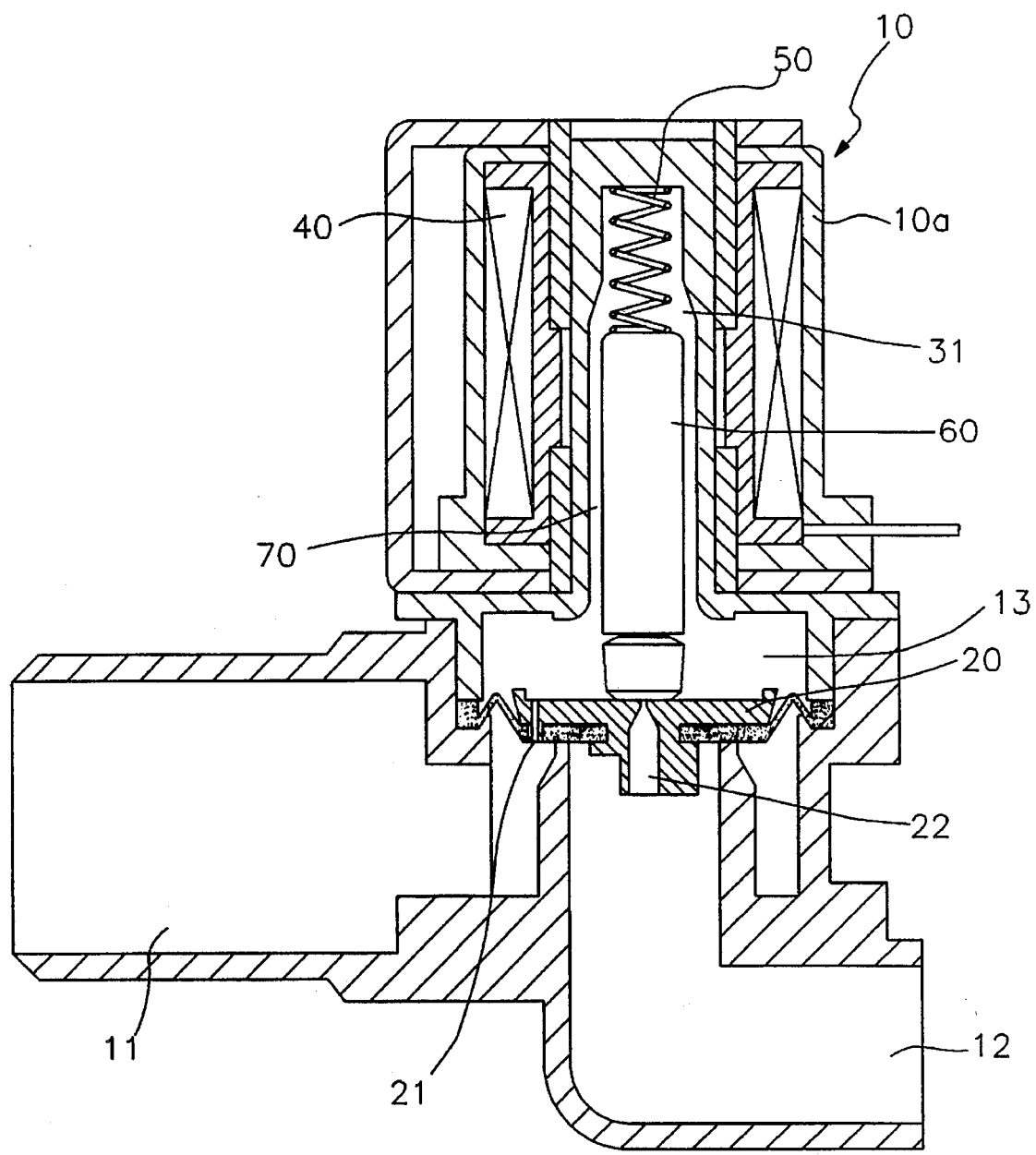
FIG. 3 is a side sectional view of a conventional water-supply valve of a washing machine.

FIG. 2 is a side sectional view of a water-supply valve of a washing machine according to a second embodiment of the present invention.

Referring to FIG. 2, a water-introducing tube 112 for introducing water is connected to a valve body 102 of the water-supply valve, and a water-supply tube 122 for supplying water into the washing tub is vertically connected to valve body 102 near water-introducing tube 112. A reservoir 132 for interconnecting water-introducing tube 112 and a water-supply tube 122 is defined directly above water-supply tube 122.

A diaphragm 202 is disposed on the bottom surface of reservoir 132, and is in close contact with water-introducing tube 112 and water-supply tube 122 to separate reservoir 132 therefrom. Diaphragm 202 has a water-inflow port 212 formed at an outer portion thereof to interconnect water-introducing tube 112 and reservoir 132 in order for water to flow into reservoir 132, and a water-exhaust port 222 at the center thereof to interconnect reservoir 132 and water-supply tube 122 in order for water retained in reservoir 132 to be supplied into the washing tub.

A first chamber 312 connected to reservoir 132 is defined above reservoir 132, and a second chamber 322 separated from first chamber 312 by a partition wall 332 is defined above first chamber 312, respectively, by a cylindrical wall 102a of valve body 102.

A first solenoid 412 and a second solenoid 422 for generating magnetic force when electric power is supplied respectively surround first and second chambers 312 and 322 in cylindrical wall 102a.

An actuator rod 602 for opening and closing water-exhaust port 222 according to the operation of first and second solenoids 412 and 422 is disposed in first chamber 312. Actuator rod 602 is elastically supported on a surface of partition wall 332 by a first spring 512, and closes water-exhaust port 222 at its lowermost position. A permanent magnet 702 is disposed on actuator rod 602.

A holding rod 802 to be elevated according to the operation of second solenoid 422 is disposed in second chamber 322. Holding rod 802 is elastically supported on an upper wall-surface of second chamber 322 by a second spring 522.

Meanwhile, a reference numeral 302 not described above designates a case surrounding cylindrical wall 102a to protect valve body 102.

Hereinafter, the operation of the water-supply valve having the above construction according to the present embodiment will be described.

When actuator rod 602 is pushed downward by first spring 502 to block off water-exhaust port 222, water introduced into reservoir 132 through water-introducing tube 112 and water-inflow port 212 is not supplied into water-supply tube 122 through water-exhaust port 222 but retained in reservoir 132. In this case, the pressure in reservoir 132 is maintained to be the same as that in water-introducing tube 112.

When an electric current is applied to first solenoid 412 automatically by a microcomputer or manually by handling a switch, magnetic force is generated by first solenoid 412, and actuator rod 602 retained at its lowermost position by first spring 502 moves upward by virtue of the magnetic force of first solenoid 412 while pressing first spring 502, and accordingly water-exhaust port 222 is open.

Meanwhile, the attractive force between holding rod 802 in second chamber 322 and permanent magnet 702 attached on actuator rod 602 is in inverse proportion to square of the distance therebetween, while the downward biasing force of first spring 512 is in proportion to the distance that first spring 512 is compressed. Therefore, after actuator rod 602 passes a position at which the attractive force and the biasing force are equal to each other in the course of moving upward, actuator rod 602 continues to move upward and then is maintained at its uppermost position while pressing spring 502 by virtue of the attractive force between permanent magnet 702 and holding rod 802 without the magnetic force of first solenoid 412.

That is, electric power supply to first solenoid 412 is ceased after actuator rod 602 passes the position at which the attractive force and the biasing force are equal to each other in the course of moving upward, and then actuator rod 602 continues to move upward only by the attractive force between holding rod 802 and permanent magnet 702.

Of course, the electric power supply to first solenoid 412 can be continued until actuator rod 602 reaches the uppermost position thereof in order to assure reliable continuous upward movement of actuator rod 602.

When actuator rod 600 is retained at its uppermost position by the attractive force, water-exhaust port 222 is open, and accordingly water retained in reservoir 132 flows through water-exhaust port 222 into water-supply tube 122. In this case, the pressure in reservoir decreases below that in water-introducing tube 112, so that water introduced into water-introducing tube 112 pushes up diaphragm 202. Accordingly, water-introducing tube 112 and water-supply tube 122 are directly connected with each other, and water is directly supplied from water-introducing tube 112 to water-supply tube 122 without passing through water-inflow port 212 and water-exhaust port 222.

When water supply into the washing tub is completed, electric power is supplied to second solenoid 422, which is then magnetized, and holding rod 802 is moved upward by the magnetic force of second solenoid 422 against elastic force of second spring 522 and the attractive force between permanent magnet 702 and holding rod 802.

After holding rod 802 passes a position at which the biasing force of second spring 522 and the attractive force between permanent magnet 702 and holding rod 802 are equal to each other in the course of moving upward, electric power supply to and accordingly provision of magnetic force by second solenoid 422 are ceased.

According to the upward movement of holding rod 802, the distance between holding rod 802 and permanent magnet 702 increases, and thereby the attractive force therebetween decreases. When the attractive force between holding rod 802 and permanent magnet 702 becomes smaller than the downward biasing force of first spring 512. Actuator rod 602 starts to go down again, and actuator rod 602 pushes diaphragm 202 downward and blocks off water-exhaust port 222 while going down.

When the lower surface of diaphragm 202 becomes in close contact with the bottom of reservoir 132 and water-exhaust port 222 is completely blocked off by actuator rod 602 as shown in FIG. 2, water supply into the washing tub is interrupted.

When actuator 602 starts to go down again, the electric power supply to second solenoid 422 and thereby the magnetic force applied to holding rod 802 by second solenoid 422 are interrupted, and holding rod 802 is returned to its initial position by the downward biasing force of second spring 522.

In this case, the electric power supply to second solenoid 422 can be continued until actuator rod 602 reaches its lowermost position in order to assure reliable continuous downward movement of actuator rod 602.

As described above in detail, in a water-supply valve of a washing machine according to the present invention, electric power needs not be continuously supplied to the water-supply valve while water is supplied into a washing tub of the washing machine, but open or closed state of the valve is maintained only by an instantaneous power supply to the valve at a moment of supplying water or interrupting the water supply. Therefore, the electric power consumption by the valve can be greatly reduced, and the breaking of fine wires of solenoid 40 and being caught on fire of solenoid 40 due to heat generated by the continuous supply of power to solenoid 40 during water supply can be prevented. Further, reliable water supply into the washing tub is guaranteed.

While the present invention has been particularly shown and described with reference to particular embodiments thereof, it will be understood by those skilled in the art that various changes in form and details may be effected therein without departing from the spirit and scope of the invention as defined by the appended claims.

I claim:

1. A water-supply valve of a washing machine comprising:

a valve body including a first chamber defined in a middle part thereof, a second chamber defined over the first chamber, and a reservoir defined beneath the first chamber and connected to the first chamber;

a water-introducing tube connected to the reservoir to introduce water thereinto;

a water-supply tube having a first end connected to the reservoir, and a second end connected to a washing tub of the washing machine;

an actuator rod movable up and down in the first chamber and the reservoir;

a diaphragm disposed movably up and down in the reservoir according to the upward and downward movements of the actuator, the diaphragm having a water-inflow port and a water-exhaust port, the water-inflow port interconnecting the water-introducing tube and the reservoir, and the water-exhaust port interconnecting the water supply tube and the reservoir, and when the actuator rod is at its lowermost position, the diaphragm being in close contact with a lower bottom surface of the reservoir by the actuator rod and the water-exhaust port of the diaphragm being blocked off by the actuator rod;

a first means for applying an upward force to the actuator rod when an electric current is applied to it, the first means enclosing an upper part of the first chamber in a cylindrical wall defining the first chamber;

a second means for applying a downward force to the actuator rod when an electric current is applied to it, the second means enclosing a lower part of the first chamber in the cylindrical wall;

a third means disposed in the second chamber for applying an upward attractive force, which varies as the actuator rod (moves up or down) reciprocates, to the actuator rod regardless of whether an electric current is applied to the water-supply valve; and a fourth means disposed on an upper wall-surface of the first chamber for applying a downward biasing force, which varies as the actuator rod reciprocates, to the actuator rod regardless of whether an electric current is applied to the water-supply valve, the downward biasing force of the fourth means being different from the upward attractive force of the third means when the actuator rod is in at least one of a lowermost position and an uppermost position, wherein water is supplied from the water-introducing tube into the water-supply tube when the actuator rod is elevated by the first means against the downward biasing force of the fourth means and retained at the uppermost position by the upward attractive force of the third means, even in case that the electric current to the first means is interrupted, while water supply is blocked off when the actuator rod is returned to the lowermost position by the second means and retained thereat by the downward biasing force of the fourth means, even in case that the electric current to the second means is interrupted.

2. A water-supply valve of a washing machine as claimed in claim 1, wherein each of the first and second means includes a first and a second solenoids respectively enclosing an upper and a lower parts of the first chamber in a cylindrical wall defining the first chamber, the first solenoid generating a magnetic force by an electric current applied thereto to elevate the actuator rod against the downward biasing force of the fourth means, the second solenoid generating a magnetic force by an electric current applied thereto to lower the actuator rod against the upward attractive force of the third means.

3. A water-supply valve of a washing machine as claimed in claim 1, wherein the third means includes a permanent magnet disposed in the second chamber.

4. A water-supply valve of a washing machine as claimed in claim 1, wherein the fourth means includes a first spring disposed on an upper wall-surface of the first chamber.

5. A water-supply valve of a washing machine comprising:

a valve body including a first chamber defined in a middle part thereof, a second chamber defined over the first chamber, and a reservoir defined beneath the first chamber and connected to the first chamber;

a water-introducing tube connected to the reservoir to introduce water thereinto;

a water-supply tube having a first end connected to the reservoir, and a second end connected to a washing tub of the washing machine;

an actuator rod movable up and down in the first chamber and the reservoir;

a diaphragm disposed movably up and down in the reservoir according to the upward and downward movements of the actuator, the diaphragm having a water-inflow port and a water-exhaust port, the water-inflow port interconnecting the water-introducing tube and the reservoir, and the water-exhaust port interconnecting the water supply tube and the reservoir, and when the actuator rod is at its lowermost position, the diaphragm being in close contact with a lower bottom surface of the reservoir by the actuator rod and the water-exhaust port of the diaphragm being blocked off by the actuator rod;

a first solenoid for elevating the actuator rod, the first solenoid enclosing an upper part of the first chamber in a cylindrical wall defining the first chamber;

a second solenoid for lowering the actuator rod, the second solenoid enclosing a lower part of the first chamber in the cylindrical wall;

a permanent magnet disposed in the second chamber to apply an upward attractive force, which varies as the actuator rod reciprocates, to the actuator rod; and a first spring disposed on an upper wall-surface of the first chamber to force the actuator rod downward by an elastic biasing force thereof, the elastic biasing force being different from the upward attractive force when the actuator rod is in at least one of a lowermost position and an uppermost position, wherein water is supplied from the water-introducing tube into the water-supply tube when the actuator rod is elevated by a magnetic force generated by the first solenoid by applying an electric current thereto against the downward biasing force and retained at the uppermost position by the upward attractive force, even in case that the electric current to the first solenoid is interrupted, while water supply is blocked off when the actuator rod is returned to the lowermost position by a magnetic force generated by the second solenoid by applying an electric current thereto against the upward attractive force and retained thereat by the downward biasing force, even in case that the electric current to the second solenoid is interrupted.

6. A water-supply valve of a washing machine comprising:

a valve body including a first chamber defined in a middle part thereof, a second chamber defined over the first chamber, and a reservoir defined beneath the first chamber and connected to the first chamber, a holding rod being dispose movably up and down in the second chamber, the holding rod being forced by an elastic biasing force of a second spring disposed on an upper wall-surface of the second chamber;

a water-introducing tube connected to the reservoir to introduce water thereinto;

a water-supply tube having a first end connected to the reservoir, and a second end connected to a washing tub of the washing machine;

an actuator rod movable up and down in the first chamber and the reservoir;

a diaphragm disposed movably up and down in the reservoir according to the upward and downward movements of the actuator, the diaphragm having a water-inflow port and a water-exhaust port, the water-inflow port interconnecting the water-introducing tube and the reservoir, and the water-exhaust port interconnecting the water-supply tube and the reservoir, and when the actuator rod is at its lowermost position, the diaphragm being in close contact with a lower bottom surface of the reservoir by the actuator rod and the exhaust-port of the diaphragm being blocked off by the actuator rod;

a first means for applying an upward force to the actuator rod when an electric current is applied to it, the first means enclosing the first chamber in a cylindrical wall defining the first and second chambers;

a second means for applying an upward force to the holding rod in the second chamber when an electric current is applied to it, the second means enclosing the second chamber in the cylindrical wall;

a third means disposed on the actuator rod for applying an upward attractive force, which varies at least as one of the actuator rod and the holding rod reciprocates, to the actuator rod regardless of whether an electric current is applied to the water-supply valve; and a fourth means disposed on an upper wall-surface of the first chamber for applying a downward biasing force, which varies as the actuator rod reciprocates, to the actuator rod regardless of whether an electric current is applied to the water-supply valve, the downward biasing force of the fourth means being larger than the upward attractive force of the third means when one of the actuator rod is at its lowermost position and the holding rod is at its uppermost position, and the downward biasing force of the fourth means being smaller than the upward attractive force of the third means when the actuator rod is at its uppermost position and the holding rod is at its lowermost position, wherein water is supplied from the water-introducing tube into the water-supply tube when the actuator is elevated by the first means against the downward biasing force of the fourth means and retained at the uppermost position by the upward attractive force of the third means, even in case that the electric current to the first means is interrupted, while water supply is blocked off when the actuator rod is returned to the lowermost position in accordance with the upward movement of the holding rod by the second means and retained thereat by the downward biasing force of the fourth means, even in case that the electric current to the second means is interrupted.

7. A water-supply valve of a washing machine as claimed in claim 6, wherein the first means includes a first solenoid enclosing the first chamber in a cylindrical wall defining the first and second chambers, and the second means includes a second solenoid enclosing the second chamber in the cylindrical wall, the first solenoid generating a magnetic force by an electric current applied thereto to elevate the actuator rod against the downward biasing force of the fourth means, the second solenoid generating a magnetic force by an electric current applied thereto to elevate the holding rod against the attractive force of the third means which is applied to the holding rod as a downward force to reduce the attractive force applied to the actuator rod.

8. A water-supply valve of a washing machine as claimed in claim 6, wherein the third means has a permanent magnet disposed on the actuator rod while being incorporated therewith, so that the attractive force thereof is applied between the actuator rod and the holding rod and varies according to a distance therebetween, and the actuator rod is lowered according to the upward movement of the holding rod against the downward biasing force of the second spring and the attractive force between the permanent magnet and the holding rod by the magnetic force generated by applying an electric current to the second solenoid.

9. A water-supply valve of a washing machine as claimed in claim 6, wherein the fourth means includes a first spring disposed on an upper wall-surface of the first chamber to force the actuator rod downward by an elastic biasing force thereof.

10. A water-supply valve of a washing machine comprising:

- a valve body including a first chamber defined in a middle part thereof, a second chamber defined over the first chamber, and a reservoir defined beneath the first chamber and connected to the first chamber;
- a water-introducing tube connected to the reservoir to introduce water thereinto;
- a water-supply tube having one end thereof connected to the reservoir, and the other end thereof connected to a washing tub of the washing machine;
- an actuator rod movable up and down in the first chamber and the reservoir;
- a diaphragm disposed movably up and down in the reservoir according to the upward and downward movements of the actuator, the diaphragm having a water-inflow port and a water-exhaust port, the water-inflow port interconnecting the water-introducing tube and the reservoir, and the water-exhaust port interconnecting the water-supply tube and the reservoir, and when the actuator rod is at its lowermost position, the diaphragm being in close contact with a lower bottom surface of the reservoir by the actuator rod and the water-exhaust port of the diaphragm being blocked off by the actuator rod;
- a first solenoid enclosing the first chamber in a cylindrical wall defining the first and second chambers;
- a second solenoid enclosing the second chamber in the cylindrical wall;
- a holding rod disposed movably up and down in the second chamber, the holding rod being forced by an elastic biasing force of a second spring disposed on an upper wall-surface of the second chamber;
- a permanent magnet disposed on the actuator rod while being incorporated therewith to apply an attractive force which varies according to a distance between the actuator rod and the holding rod, to the actuator rod and the holding rod; and
- a first spring disposed on an upper wall-surface of the first chamber to force the actuator rod downward by an elastic biasing force thereof,
- wherein water is supplied from the water-introducing tube into the water-supply tube when the actuator rod is elevated by a magnetic force generated by the first solenoid by applying an electric current thereto against the downward biasing force and retained at the uppermost position by the attractive force, even in case that the electric current to the first solenoid is interrupted, while water supply is blocked off when the actuator rod is returned to the lowermost position as the holding rod is elevated by a magnetic force generated by the second solenoid by applying an electric current thereto against the downward biasing force of the second spring and the attractive force, and retained threat by the downward biasing force of the first spring, even in case that the electric current to the second solenoid is interrupted.

* * * * *